United States Patent
Pereira et al.

(10) Patent No.: US 8,321,940 B1
(45) Date of Patent: Nov. 27, 2012

(54) SYSTEMS AND METHODS FOR DETECTING DATA-STEALING MALWARE

(75) Inventors: Shane Pereira, Newbury Park, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 398 days.

(21) Appl. No.: 12/771,433

(22) Filed: Apr. 30, 2010

(51) Int. Cl.
*G06F 11/00* (2006.01)
(52) U.S. Cl. .......................................... 726/23
(58) Field of Classification Search ........ 726/22, 726/23, 24; 713/165, 188, 193
See application file for complete search history.

(56) References Cited

U.S. PATENT DOCUMENTS

| | | | |
|---|---|---|---|
| 7,096,326 B1 * | 8/2006 | Friedman et al. | 711/154 |
| 7,565,686 B1 * | 7/2009 | Sobel et al. | 726/2 |
| 7,971,258 B1 * | 6/2011 | Liao et al. | 726/24 |
| 8,079,085 B1 * | 12/2011 | Wu et al. | 726/24 |
| 2007/0289019 A1 * | 12/2007 | Lowrey | 726/24 |
| 2009/0138969 A1 * | 5/2009 | Kim et al. | 726/22 |
| 2009/0144821 A1 * | 6/2009 | Wong et al. | 726/22 |
| 2009/0271863 A1 * | 10/2009 | Govindavajhala et al. | 726/23 |
| 2010/0058432 A1 * | 3/2010 | Neystadt et al. | 726/1 |

* cited by examiner

*Primary Examiner* — Beemnet Dada
(74) *Attorney, Agent, or Firm* — Advantedge Law Group LLC

(57) ABSTRACT

A computer-implemented method for detecting data-stealing malware may include: 1) detecting an attempt by an untrusted application to access a storage location that is known to be used by a legitimate application when storing potentially sensitive information, 2) determining that the legitimate application is not installed on the computing device, 3) determining that the untrusted application represents a potential security risk, and then 4) performing a security operation on the untrusted application. Corresponding systems and computer-readable instructions embodied on computer-readable media are also disclosed.

17 Claims, 6 Drawing Sheets

Data-Protection List
122

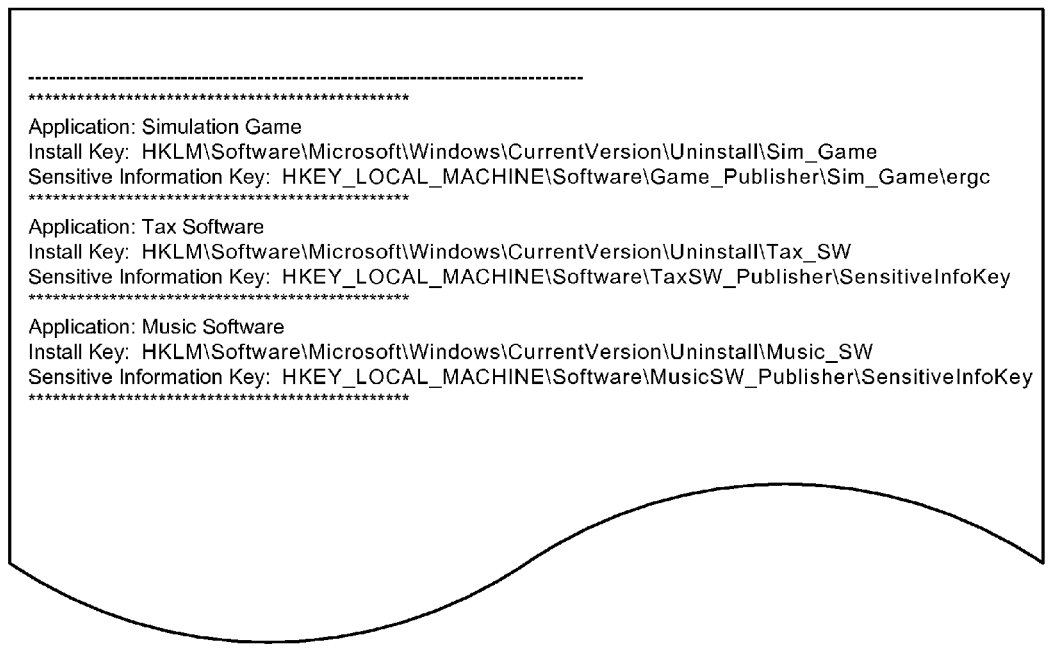

```
--------------------------------------------------------------------------------
**************************************************
Application: Simulation Game
Install Key:  HKLM\Software\Microsoft\Windows\CurrentVersion\Uninstall\Sim_Game
Sensitive Information Key:  HKEY_LOCAL_MACHINE\Software\Game_Publisher\Sim_Game\ergc
**************************************************
Application: Tax Software
Install Key:  HKLM\Software\Microsoft\Windows\CurrentVersion\Uninstall\Tax_SW
Sensitive Information Key:  HKEY_LOCAL_MACHINE\Software\TaxSW_Publisher\SensitiveInfoKey
**************************************************
Application: Music Software
Install Key:  HKLM\Software\Microsoft\Windows\CurrentVersion\Uninstall\Music_SW
Sensitive Information Key:  HKEY_LOCAL_MACHINE\Software\MusicSW_Publisher\SensitiveInfoKey
**************************************************
```

*FIG. 4*

SYSTEMS AND METHODS FOR DETECTING DATA-STEALING MALWARE

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. Oftentimes, malware is used to gather sensitive data (e.g., passwords, personal user information, etc.) stored on computing devices.

Legitimate software programs often store sensitive data in predictable locations on computing devices, including registry and file locations. For example, a computer game may store user credentials or serial numbers in specific registry keys. Because legitimate software programs often store such sensitive data in the same or predictable locations, malware applications may be programmed to target these predictable storage locations. For example, a malware application may be programmed to scan a computer's registry for registry keys that are known to contain sensitive information, such as passwords, serial keys, personal user information, or the like.

SUMMARY

As will be described in greater detail below, the instant disclosure generally relates to systems and methods for detecting data-stealing malware (i.e., malware designed to surreptitiously obtain or extract potentially sensitive information, such as passwords or serial keys, from a user's computing device). In one example, one or more of the various systems described herein may accomplish such a task by: 1) detecting an attempt by an untrusted application or process (i.e., a process or application whose legitimacy is unknown or undetermined) to access a storage location (e.g., a registry key and/or a file) that is known to be used by a legitimate application when storing potentially sensitive information (such as passwords, installation or license keys, user credentials, and/or personal user data), 2) determining that the legitimate application is not installed on the computing device and, as such, that the untrusted application represents a potential security risk, and then 3) performing a security operation on the untrusted application.

In some examples, the systems described herein may detect the attempt by the untrusted application to access the storage location by monitoring all attempts to access the storage location in question. For example, the systems described herein may monitor all attempts to access registry keys or file locations known to be used by legitimate applications when storing potentially sensitive information.

In some embodiments, the systems described herein may, either before or after an attempt to access the storage location is detected, determine that the storage location is known to be used by a legitimate application when storing potentially sensitive information by: 1) accessing a list that identifies storage locations known to be used by legitimate applications when storing potentially sensitive information and then 2) determining that the storage location in question is identified on the list. The systems described herein may access this list by, for example, accessing a locally stored copy of the list (maintained, e.g., by antivirus software media installed on the computing device) and/or by receiving the list from a security server.

In some examples, the systems described herein may, by accessing the list, identify a legitimate application associated with the storage location in question. In such examples, the systems described herein may retrieve an application identifier (such as registry key known to be generated by the application during installation) associated with the legitimate application from the list. The systems described herein may then determine that the legitimate application in question is not installed on the computing device by determining that the application identifier associated with the legitimate application is not present on the computing device.

In some examples, the systems described herein may perform a security operation on the untrusted application by, for example, preventing the untrusted application from accessing the storage location, preventing the computing device from communicating with a computing device that distributed the untrusted application, deleting the untrusted application from the computing device, quarantining the untrusted application, adding the untrusted application to a blacklist database, and/or updating reputation information associated with the untrusted application in a reputation database.

As will be explained in greater detail below, by detecting attempts by untrusted applications to access storage locations on a computing device that are known to be used by legitimate applications that are not present on the computing device, the systems and methods described herein may effectively detect data-stealing malware. Accordingly, the systems and methods described herein may provide a greater degree of protection against constantly evolving malware threats.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a an illustration of an exemplary data-protection list that identifies storage locations and/or application identifiers associated with known legitimate applications.

Figure 1:
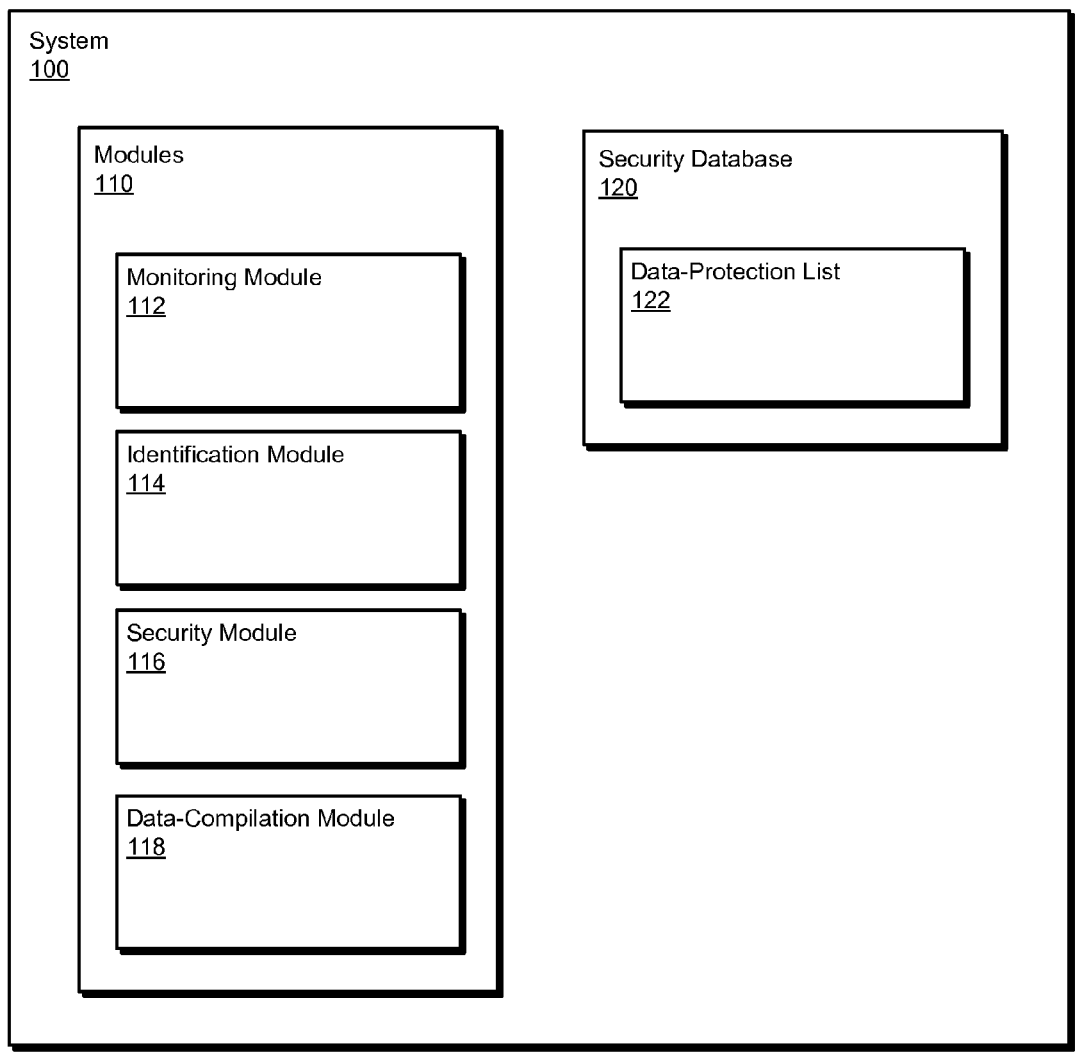
FIG. 1 is a block diagram of an exemplary system for detecting data-stealing malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting data-stealing malware. Embodiments of the instant disclosure may enable one or more modules on a computing device to detect data-stealing malware by detecting an attempt by an untrusted application (i.e., a process or application whose legitimacy is unknown or undetermined) to access a storage location that is known to be used by a legitimate application when storing potentially sensitive information and determining that the legitimate application is not installed on the computing device. For example, and as will be explained in greater detail below, one or more modules on the computing device may detect attempts by a program to access a data storage location, such as a file or registry key, that is not present on a user's computing device. According to some embodiments, one or modules may determine that the untrusted application represents a potential security risk and may perform a security operation on the untrusted application.

Figure 2:
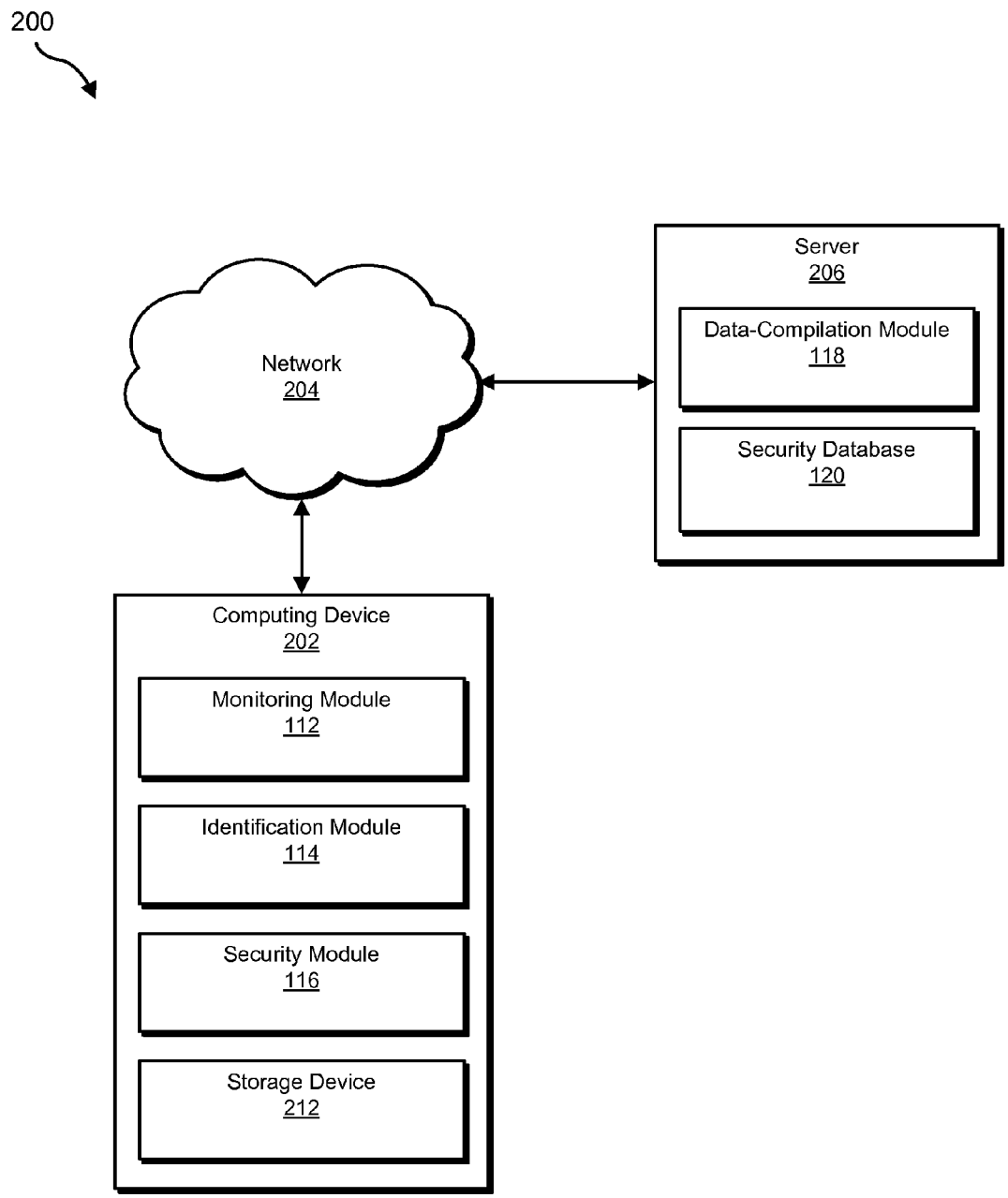
FIG. 2 is a block diagram of an additional exemplary system for detecting data-stealing malware.

The following will provide, with reference to FIGS. 1-2, detailed descriptions of exemplary systems for detecting data-stealing malware. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting data-stealing malware. As illustrated in this figure, exemplary system 100 may include one or more modules 110 for performing one or more tasks. For example, and as will be explained in greater detail below, exemplary system 100 may include a monitoring module 112 programmed to detect an attempt by an untrusted application to access a storage location (such as a file or registry key) that is known to be used by a legitimate application when storing potentially sensitive information. Exemplary system 100 may also include an identification module 114 programmed to determine whether the legitimate application is installed on the computing device.

In addition, and as will be described in greater detail below, exemplary system 100 may include a security module 116 programmed to determine whether the untrusted application represents a potential security risk and, if so, to perform a security operation on the untrusted application. Exemplary system 100 may additionally include a data-compilation module 118 programmed to compile and/or identify data associated with known legitimate applications. For example, and as will be described in greater detail below, data compilation module 118 may compile a list (such as data-protection list 122 in FIG. 4) of storage locations (such as registry keys, files or file paths, etc.) and/or application identifiers (such as registry keys, installation paths, add/remove information, system information, etc.) associated with known legitimate applications. Although illustrated as separate elements, one or more of modules 110 in FIG. 1 may represent portions of a single module or application.

In certain embodiments, one or more of modules 110 in FIG. 1 may represent one or more software applications or programs that, when executed by a computing device, may cause the computing device to perform one or more tasks. For example, and as will be described in greater detail below, one or more of modules 110 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 110 in FIG. 1 may also represent all or portions of one or more special-purpose computers configured to perform one or more tasks.

As illustrated in FIG. 1, exemplary system 100 may also include one or more databases, such as security database 120. In one example, database 120 may include a data-protection list 122 that, as will be explained in greater detail below, may identify storage locations (such as specific registry keys, files, file paths, etc.) and/or application identifiers (such as registry keys, installation paths, add/remove information, system information, etc.) associated with known legitimate applications.

Security database 120 may represent portions of a single database or computing device or a plurality of databases or computing devices. For example, security database 120 may represent a portion of computing device 202 and/or server 206 in FIG. 2, computing system 510 in FIG. 5, and/or portions of exemplary network architecture 600 in FIG. 6. Alternatively, security database 120 may represent one or more physically separate devices capable of being accessed by a computing device, such as computing device 202 and/or server 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of an exemplary system 200 in FIG. 2. As shown in FIG. 2, system 200 may include a computing device 202 in communication with a server 206 (such as a security server) via a network 204. In one embodiment, and as will be described in greater detail below, computing device 202 may be programmed to detect data-stealing malware on computing device 202 and/or a device in communication with computing device 202.

For example, and as will be explained in greater detail below, exemplary computing device 202 may include monitoring module 112, identification module 114, security module 116, and/or storage device 212. In this example, monitoring module 112 may detect attempts to access storage locations in storage device 212. For example, monitoring module 112 may monitor attempts by processes or applications on computing device 202 to access registry and/or file locations in storage device 212 that are known to be used by legitimate applications when storing potentially sensitive information (such as passwords, license or serial keys, etc.). In one example, monitoring module 112 may identify such storage locations by accessing a compiled data collection (such as data-protection list 122 in FIG. 4) that identifies storage locations that are known to be used by legitimate applications when storing potentially sensitive information.

If monitoring module 112 detects an attempt by an untrusted application to access a storage location in storage device 212 that is known to be used by a legitimate application when storing potentially sensitive information, then identification module 114 may determine whether the legitimate application that typically uses the storage location is present on computing device 202. For example, identification module may search computing device 202 for an application identifier (such as a registry key, installation path, add/remove information, system information, etc.) that is known to be associated with the legitimate application. In some embodiments, monitoring module 112 may access a data collection (such as data-protection list 122 in FIG. 4) that identifies storage locations and application identifiers that are associated with legitimate applications, and then identification module 114 may search computing device 202 for one or more of the application identifiers associated with the application in question.

If identification module 114 determines that the legitimate application is not installed on the computing device, then security module 116 may determine that the untrusted application represents a potential security risk and perform a security operation on the untrusted application. For example, security module 116 may prevent the untrusted application from accessing storage device 212 and/or may quarantine or delete the untrusted application from computing device 202.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Server 206 generally represents any type or form of computing device that is capable of compiling data that may be used by computing devices, such as computing device 202, to identify malware. Examples of server 206 include, without limitation, application servers and database servers configured to provide various database services and/or run certain software applications. In at least one embodiment, server 206 may represent a security server that provides malware-identification information (such as data-protection list 122) to computing device 202. As illustrated in FIG. 2, server 206 may include data-compilation module 118 and security database 120. In some embodiments, data-compilation module 118 and/or security database 120 may also be located on computing device 202.

Figure 3:
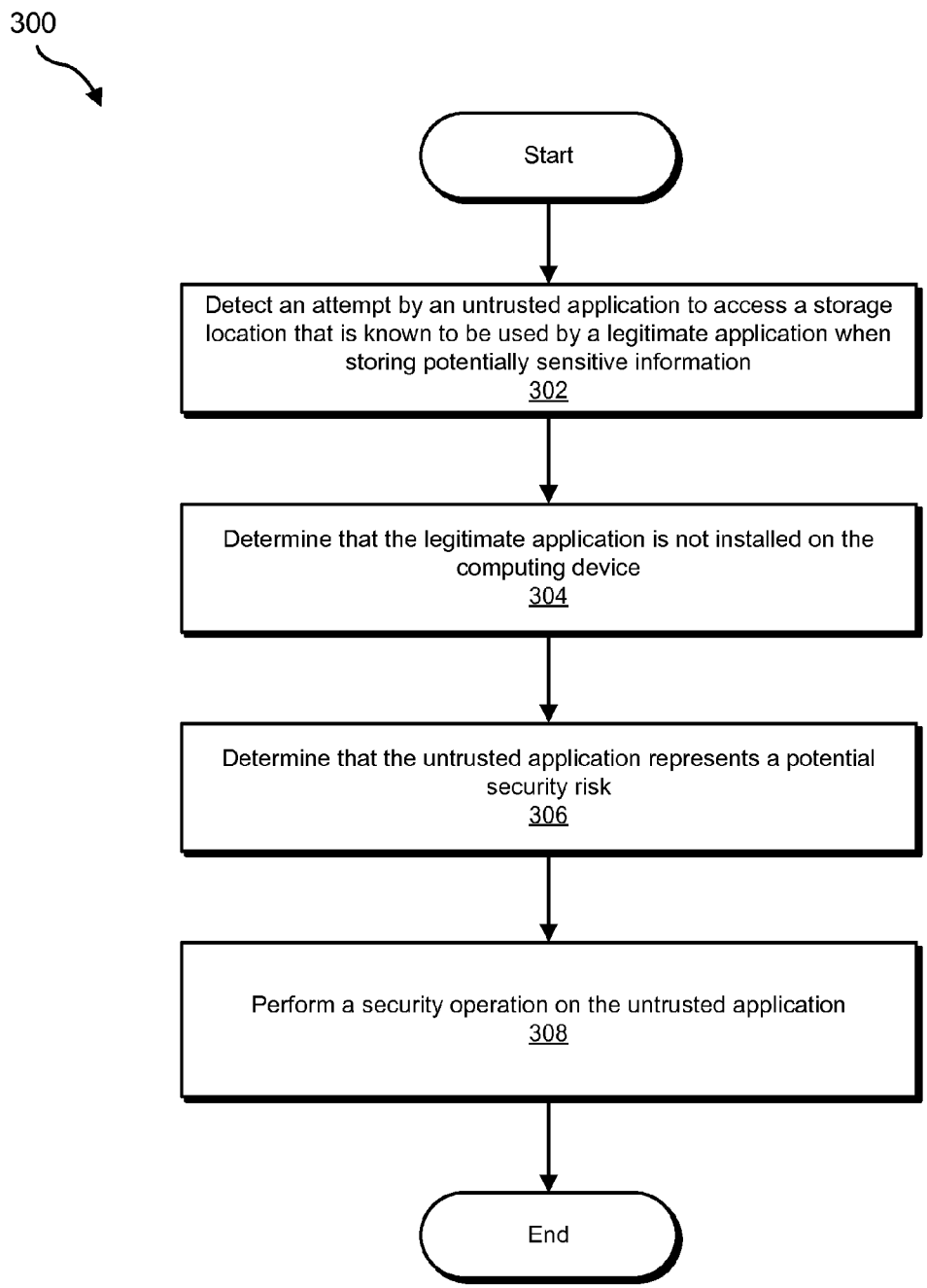
FIG. 3 is a flow diagram of an exemplary method for detecting data-stealing malware.

FIG. 3 is a flow diagram of an exemplary computer-implemented method 300 for detecting data-stealing malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one more of the various systems described herein may detect an attempt by an untrusted application to access a storage location that is known to be used by a legitimate application when storing potentially sensitive information. For example, monitoring module 112 may, as part of computing device 202 in FIG. 2, detect an attempt by an untrusted application to access a specific registry key within storage device 212 that is known to contain potentially sensitive information, such as license keys or user credentials, stored by a legitimate application.

The systems described herein may perform step 302 in a variety of ways and in a variety of contexts. In some examples, monitoring module 112 may be programmed to monitor attempts to access specific registry and/or file locations on computing device 202 (i.e., specific locations that are known to be used by legitimate applications when storing potentially sensitive information). In other embodiments, monitoring module 112 may be programmed to simply monitor all attempts to access a computing device's registry.

The term "untrusted application" may refer to an application or process whose legitimacy is unknown or undetermined. In contrast, the term "legitimate application" may refer to a process or application that is recognized by system 200 and/or a user or administrator of system 200 as a program that is likely to be free of malware and/or that is otherwise authorized for use by at least a portion of system 200, such as computing device 202. For example, a legitimate application may include a software program (such as a video game) installed on computing device 202 by a user.

In addition, the term "potentially sensitive information" may represent information that, if publicly revealed or disclosed, may result in the loss of an advantage or level of security. Examples of potentially sensitive information include, without limitation, user credentials (passwords, user names, etc.), license or serial keys, personal user data (Social Security numbers, birthdates, addresses, etc.), or the like. Similarly, the term "storage location" may refer to any storage or memory location that may be used by an application when storing potentially sensitive information. Examples of such storage locations include, without limitation, registry locations (e.g., registry keys), file locations or file paths (containing, e.g., configuration or temporary files, etc.), etc.

For example, a user, administrator, software service provider, and/or other authorized party may install various legitimate applications on computing device 202. These legitimate applications may store data (including potentially sensitive information) in specified storage locations on computing device 202, such as locations in storage device 212. For example, a legitimate application (such as a video game) may store potentially sensitive data (such as passwords, license or serial keys, user credentials, personal user data, or the like) in a specified storage location on computing device 202, such as a registry location (e.g., a registry key) and/or a file location (e.g., a configuration file, a temporary file, etc.).

Either before or after an attempt to access a storage location is detected in step 302, system 200 may determine that the storage location in question is known to be used by a legitimate application when storing potentially sensitive information. In one example, monitoring module 112 may accomplish such a task by: 1) accessing a data collection (such as a data-protection list 122 in FIG. 4) that contains a list of known legitimate applications and application identifiers and/or storage locations (i.e., storage locations that are known to be used when storing potentially sensitive information) associated with the same and then 2) determining that the storage location in question is identified on the list. For example, either before or after monitoring module 112 detects an attempt to access a registry key (such as "HKEY_LOCAL_MACHINE\Software\Game_Publisher\Sim_Game\ergc") in step 302, monitoring module 112 may determine, by accessing data-protection list 122 in FIG. 4, that a popular video game is known to store potentially sensitive information (such as serial numbers or user credentials) within this registry key.

As detailed above, data-protection list 122 may be stored in a database on computing device 202 and/or on a computing device or server that is in communication with computing device 202, such as security database 120 on server 206. As such, monitoring module 112 may access data-protection list 122 by: 1) retrieving or receiving the same from a server, such as server 206, that is in communication with computing device 202 via network 204 and/or 2) accessing a locally stored copy of the same (i.e., a copy stored in storage device 212 on computing device 202). For example, monitoring module may access a data collection or list that is part of an antivirus application installed on computing device 202.

The systems described herein may obtain and/or generate data-protection list 122 in a variety of ways. In one embodiment, data-protection list 122 may be generated by compiling data received from one or more third party providers. For example, data-compilation module 118 may compile application data received from manufacturers of legitimate software programs and/or from other security service providers. In another embodiment, data-compilation module 118 may generate a list of application identifiers and/or storage locations used by legitimate applications when storing potentially sensitive information by collecting, aggregating, and/or analyzing data from thousands or potentially millions of computing devices, such as the installation of user base of a security-software publisher.

For example, data-compilation module 118 may determine (by, e.g., compiling data received from one or more third party providers and/or by collecting, aggregating, and/or analyzing data from thousands or potentially millions of computing devices) that a popular simulation video game stores the registry key "HKLM\Software\Microsoft\Windows\CurrentVersion\Uninstall\Sim_Game" within the registry of a computing device on which the video game is installed. Data-compilation module 118 may also determine (by, e.g., compiling data received from one or more third party providers and/or by collecting, aggregating, and/or analyzing data from thousands or potentially millions of computing devices) that this same video game stores its serial numbers within the registry key "HKEY_LOCAL_MACHINE\Software\Game_Publisher\Sim_Game\ergc." In this example, data-compilation module 118 may store information that identifies both registry keys within data-protection list 122, as illustrated in FIG. 4.

Returning to FIG. 3, at step 304 the systems described herein may determine that the legitimate application referenced in step 302 is not installed on the computing device. For example, identification module 114 may, as part of computing device 202 in FIG. 2, determine that a legitimate application that is known to store potentially sensitive information in the storage location accessed in step 302 is not present on computing device 202.

The systems described herein may perform step 304 in a variety of ways and in a variety of contexts. In some examples, the systems described herein may perform step 304 by: 1) identifying a legitimate application that is known to store potentially sensitive information in the storage location accessed in step 302 and then 2) determining that this application is not present on the computing device in question. For example, if monitoring module 112 detects an attempt to access the registry key "HKEY_LOCAL_MACHINE\Software\Game_Publisher\Sim_Game\ergc" in step 302, then in step 304 identification module 114 may, by accessing data-protection list 122 in FIG. 4, determine that the application "Simulation Game" is known to store potentially sensitive information (such as serial keys) within this registry key.

In one example, the systems described herein may determine that an application is not installed on a computing device by determining that an application identifier known to be associated with the application is not present on the computing device. The term "application identifier," as used herein, may refer to any type or form of data that may be used to identify an application, including information that may be used to verify whether an application has been installed on a computing device. Examples of application identifiers include, without limitation, application names, registry keys, installation paths, add/remove information, system information, or the like.

For example, identification module 114 may determine whether a specific game is installed on computing device 202 by determining whether the registry key "HKLM\Software\Microsoft\Windows\CurrentVersion\Uninstall\Sim_Game" is located with the registry of computing device 202. If identification module 114 is unable to locate this registry key within the registry of computing device 202, then identification module 114 may determine that the video game in question is not installed on computing device 202.

Returning to FIG. 3, at step 306 the systems described herein may determine that the untrusted application detected in step 302 represents a potential security risk. For example, security module 116 may, as part of computing device 202 in FIG. 2, determine that the untrusted application represents a potential security risk since it is attempting to access a storage location that contains potentially sensitive information that is known to be used by a legitimate application that is not installed on computing device 202.

At step 308, the systems described herein may perform a security operation on the untrusted application in question. For example, if security module 116 determines that the untrusted application detected in step 302 represents a potential security risk, then security module 116 may, as part of computing device 202 in FIG. 2, perform a security operation on the untrusted application in order to protect computing device 202.

Security module 116 may perform any of a variety of security operations on the untrusted application. For example, security module 116 may prevent the untrusted application from accessing the storage location in question, prevent computing device 202 from executing the untrusted application, prevent computing device 202 from communicating with a computing device or server that distributed the untrusted application, quarantine the untrusted application, and/or delete the untrusted application from computing device 202. Security module 108 may also add at least a portion of the untrusted application's file path, and/or a hash of the untrusted application, to a blacklist database and/or add at least a portion of the untrusted application's file path or hash to a reputation database. Upon completion of step 308, exemplary method 300 in FIG. 3 may terminate.

As detailed above, by detecting attempts by untrusted applications to access storage locations on a computing device that are known to be used by legitimate applications that are not present on the computing device, the systems and methods described herein may effectively detect data-stealing malware. Accordingly, the systems and methods described herein may provide a greater degree of protection against constantly evolving malware threats.

Figure 5:
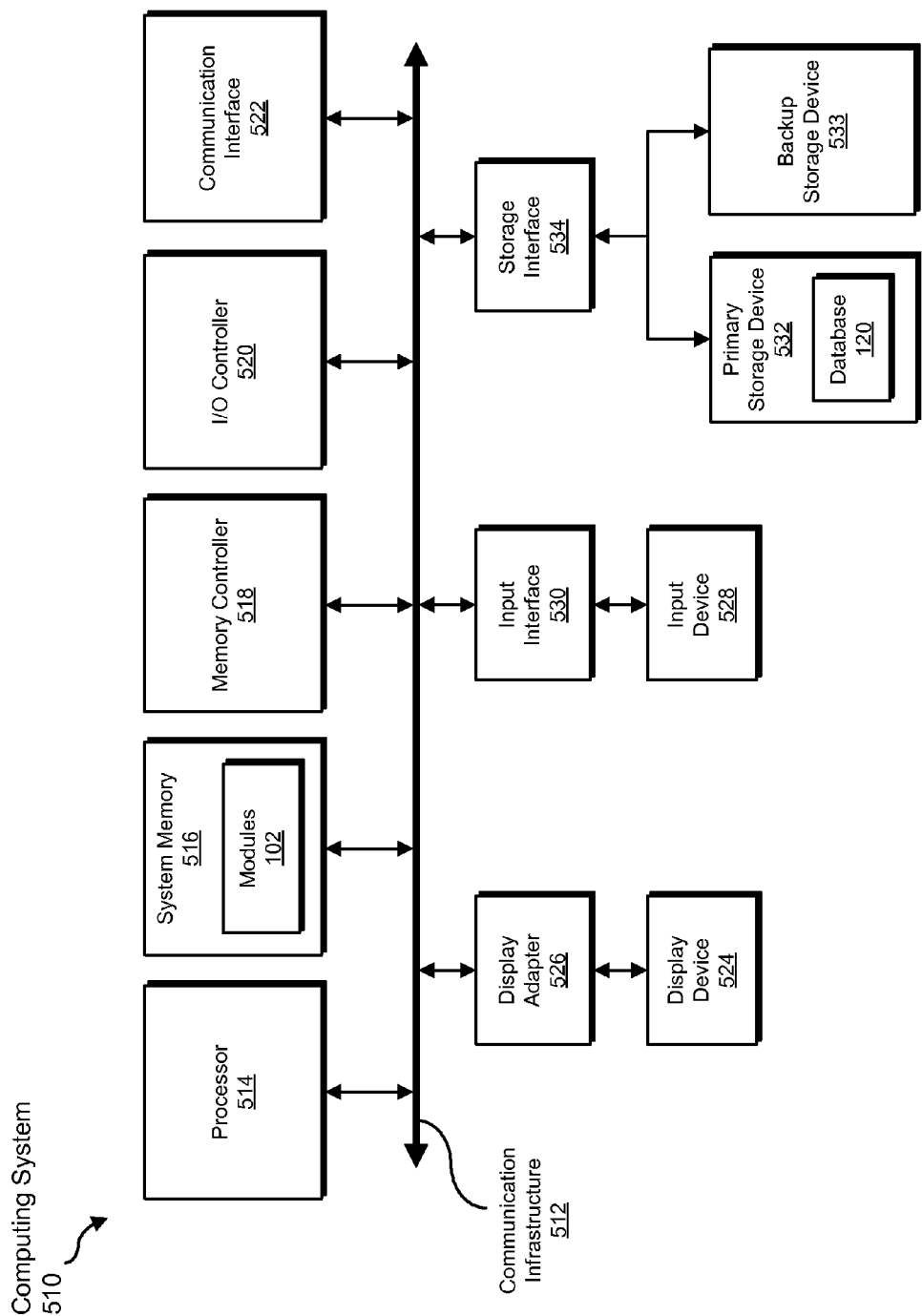
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the detecting, determining, performing, monitoring, preventing, deleting, quarantining, adding, updating, accessing, receiving, identifying, and/or retrieving steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as detecting, determining, performing, monitoring, preventing, deleting, quarantining, adding, updating, accessing, receiving, identifying, and/or retrieving.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the detecting, determining, performing, monitoring, preventing, deleting, quarantining, adding, updating, accessing, receiving, identifying, and/or retrieving steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the detecting, determining, performing, monitoring, preventing, deleting, quarantining, adding, updating, accessing, receiving, identifying, and/or retrieving steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the detecting, determining, performing, monitoring, preventing, deleting, quarantining, adding, updating, accessing, receiving, identifying, and/or retrieving steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, security database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the detecting, determining, performing, monitoring, preventing, deleting, quarantining, adding, updating, accessing, receiving, identifying, and/or retrieving steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
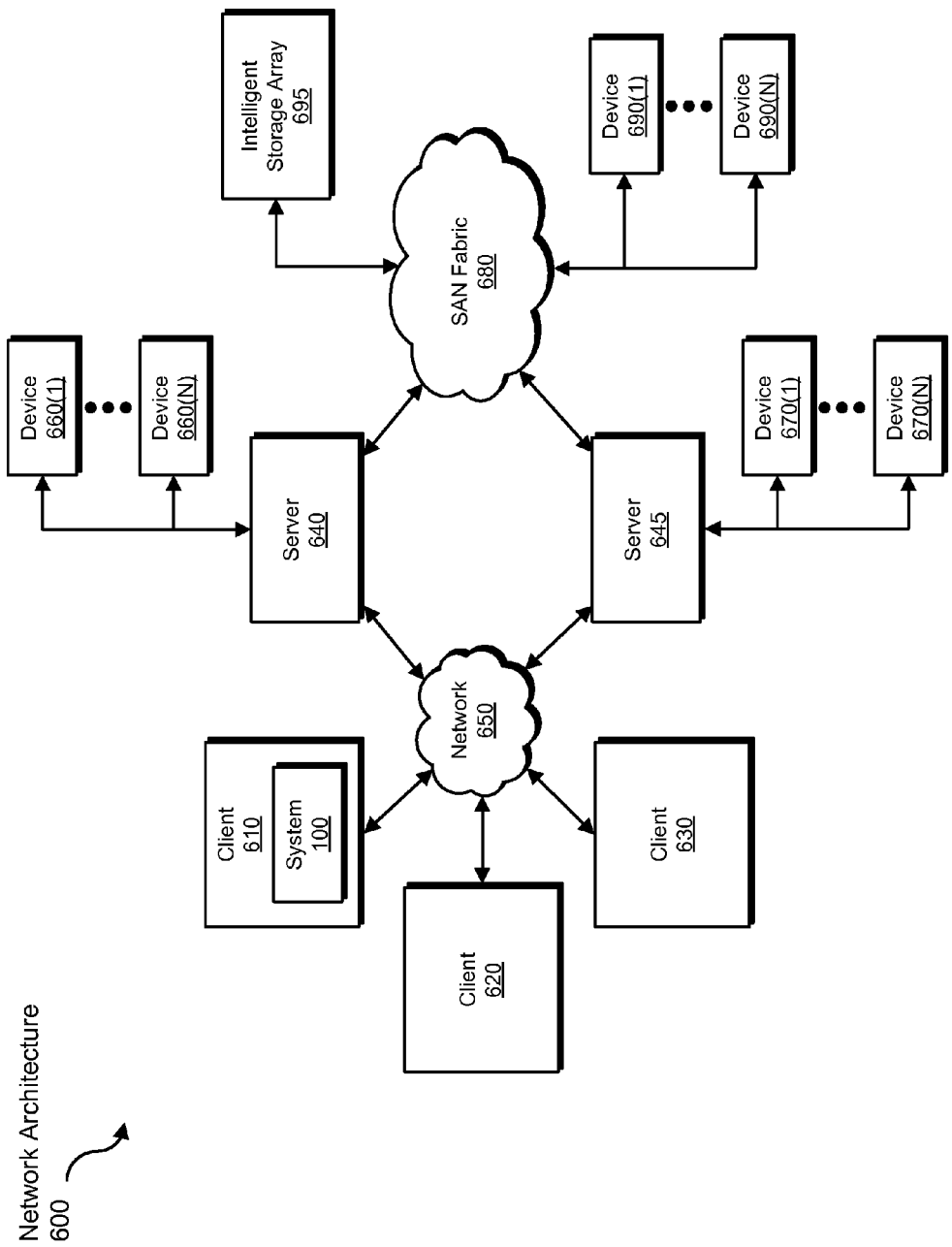
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client systems 610, 620, and/or 630 and/or servers 640 and/or 645 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the detecting, determining, performing, monitoring, preventing, deleting, quarantining, adding, updating, accessing, receiving, identifying, and/or retrieving steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for detecting data-stealing malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, security module 116 and/or training module 118 in FIG. 1 may transform various characteristics and/or properties of computing device 202 in FIG. 2 by deleting and/or modifying files stored on computing device 202, server 206, storage device 212, and/or security database 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting data-stealing malware the method comprising:

detecting an attempt by an untrusted application to access a storage location on a computing device that is known to be used by a legitimate application when storing potentially sensitive information;

determining that the legitimate application is not installed on the computing device by determining that a registry key known to be associated with the legitimate application is not present on the computing device;

determining that the untrusted application represents a potential security risk;

performing a security operation on the untrusted application to protect the computing device from the untrusted application;

wherein the method is performed by at least one processor of the computing device.

2. The method of claim 1, wherein detecting the attempt by the untrusted application to access the storage location comprises monitoring attempts to access the storage location.

3. The method of claim 1, wherein the storage location comprises at least one of:

a registry key;

a file.

4. The method of claim 1, wherein the registry key comprises an uninstall registry key.

5. The method of claim 1, wherein performing the security operation on the untrusted application comprises at least one of:
- preventing the untrusted application from accessing the storage location;
- preventing the computing device from communicating with a computing device that distributed the untrusted application;
- deleting the untrusted application from the computing device;
- quarantining the untrusted application;
- adding the untrusted application to a blacklist database;
- updating reputation information associated with the untrusted application in a reputation database.

6. The method of claim 1, wherein the potentially sensitive information comprises at least one of:
- a password;
- an install key;
- a license key;
- user credentials;
- personal user data.

7. The method of claim 1, further comprising determining that the storage location is known to be used by the legitimate application when storing potentially sensitive information by:
- accessing a list that identifies storage locations known to be used by legitimate applications when storing potentially sensitive information;
- determining that the storage location is identified on the list.

8. The method of claim 7, wherein accessing the list comprises at least one of:
- receiving the list from a security server;
- accessing a locally stored copy of the list.

9. The method of claim 7, further comprising identifying the legitimate application by determining that the legitimate application is associated with the storage location within the list.

10. The method of claim 9, wherein identifying the legitimate application further comprises retrieving an application identifier associated with the legitimate application from the list.

11. A system for detecting data-stealing malware, the system comprising:
- a monitoring module programmed to detect an attempt by an untrusted application to access a storage location on a computing device that is known to be used by a legitimate application when storing potentially sensitive information;
- an identification module programmed to determine that the legitimate application is not installed on the computing device by determining that a registry key known to be associated with the legitimate application is not present on the computing device;
- a security module programmed to:
  - determine that the untrusted application represents a potential security risk;
  - perform a security operation on the untrusted application to protect the computing device from the untrusted application;
- a processor of the computing device for executing the monitoring module, the identification module, and the security module.

12. The system of claim 11, wherein the monitoring module is programmed to monitor attempts to access the storage location.

13. The system of claim 11, wherein the monitoring module is programmed to determine that the storage location is known to be used by the legitimate application when storing potentially sensitive information by:
- accessing a list that identifies storage locations known to be used by legitimate applications when storing potentially sensitive information;
- determining that the storage location is identified on the list.

14. The system of claim 13, wherein the monitoring module is programmed to access the list by at least one of:
- receiving the list from a security server;
- accessing a locally stored copy of the list.

15. The system of claim 13, wherein the monitoring module is programmed to identify the legitimate application by determining that the legitimate application is associated with the storage location within the list.

16. The system of claim 15, wherein the monitoring module is programmed to identify the legitimate application by retrieving an application identifier associated with the legitimate application from the list.

17. A non-transitory computer-readable-storage medium comprising one or more computer-executable instructions that, when executed by at least one processor of a computing device, cause the computing device to:
- detect an attempt by an untrusted application to access a storage location that is known to be used by a legitimate application when storing potentially sensitive information;
- determine that the legitimate application is not installed on the computing device by determining that a registry key known to be associated with the legitimate application is not present on the computing device;
- determine that the untrusted application represents a potential security risk;
- perform a security operation on the untrusted application to protect the computing device from the untrusted application.

* * * * *